J. P. MAGNEY.
ELASTIC TIRE.
APPLICATION FILED JULY 6, 1908.
965,204.
Patented July 26, 1910.
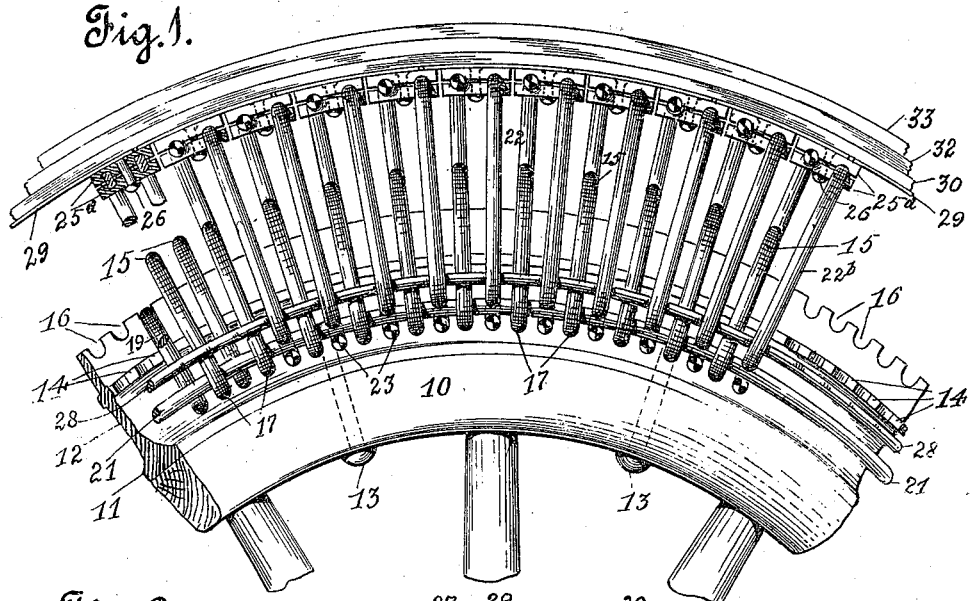
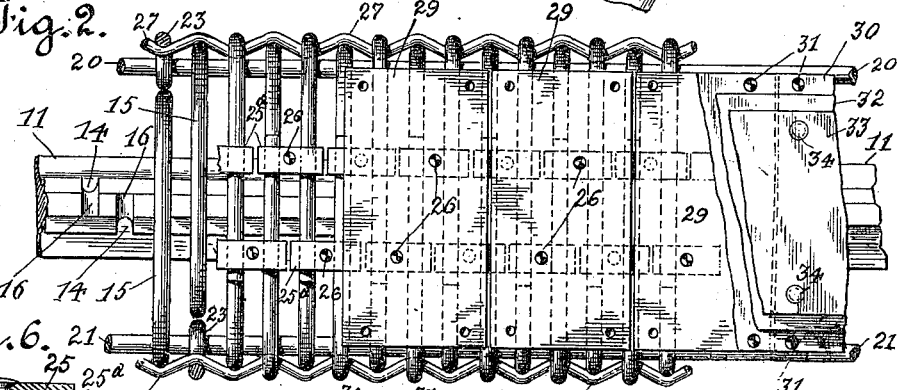
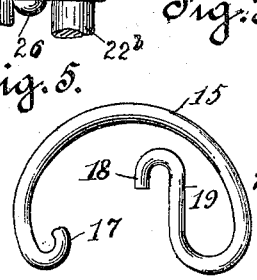
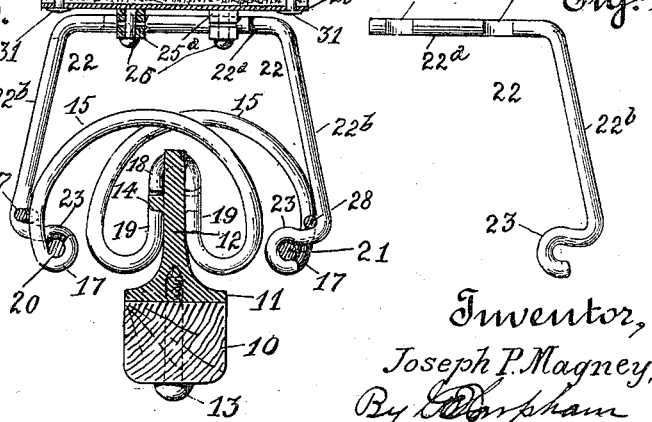
Witnesses.
Inventor,
Joseph P. Magney,
By Upham
Attorney.

UNITED STATES PATENT OFFICE.

JOSEPH P. MAGNEY, OF LOS ANGELES, CALIFORNIA, ASSIGNOR TO SPRING TIRE COMPANY, OF LOS ANGELES, CALIFORNIA, A CORPORATION OF ARIZONA TERRITORY.

ELASTIC TIRE.

965,204.  Specification of Letters Patent.  Patented July 26, 1910.

Application filed July 6, 1908. Serial No. 441,999.

*To all whom it may concern:*

Be it known that I, JOSEPH P. MAGNEY, a citizen of the United States, residing in Los Angeles, county of Los Angeles, and State of California, have invented new and useful Improvements in Elastic Tires for Wheels, of which the following is a specification.

My invention relates to an elastic tire which is secured upon the felly of the wheel and consists essentially of a metallic ring having an outwardly projecting central rib and sectional central springs secured upon such rib and sectional outer or rim springs connected to the outer ends of the central springs, and a suitable tread for the rim springs, such springs being of such configuration that they will yield both transversely and vertically, and the objects thereof are to provide a tire of a simple and economical construction which is adapted for high speed and which is not liable to puncture. It is specially adapted for automobiles.

I accomplish these objects by the tire described herein and illustrated in the accompanying drawings, in which:

Figure 1 is a side elevation of a fragment of my improved tire in place on a fragment of a felly. Fig. 2 is a plan or edge view of the parts shown in Fig. 1. Fig. 3 is a cross section of the tire and felly. Figs. 4 and 5 are details of the springs used in the construction of the tire. Fig. 6 is a detail of the connection between the rim springs and clips.

In the drawings 10 is the wooden felly of the wheel to which is secured an annular metallic ring 11 having an outwardly projecting central rib 12. Ring 11 is secured to the felly by screws 13 which pass up through the felly and screw into the ring. Upon the sides of rib 12 and near the top thereof are spacing lugs 14 which space and separate and laterally support the inner ends of the inner central springs 15, which inner ends also pass through notches 16 in the top of the rib. These inner springs have C-shaped bodies as best shown in Fig. 5, and are provided with outer hooks 17 and inner hooks 18. The inner hooks are connected by a straight section 19 with the body. These inner hooks hook over the central rib and are received in the notches thereof and the straight portion 19 is received between lugs 14 on the sides of the rib. In assembling these inner springs the outer hook of one spring would be on one side of the central rib, while the outer hook of the next spring adjacent thereto would be on the other side of the central rib as best shown in Fig. 3 and the body passes over the central rib. In the outer hooks of these central springs are received the annular steel connecting rings 20 and 21. The outer or rim springs 22 are composed of what may be termed a horizontal member $22^a$, and a side member $22^b$, which side member preferably lies at a slightly obtuse angle to the horizontal portion as best shown in Figs. 3 and 4 and forms what may be termed an L-shaped spring. The lower end of the side member terminates in a hood 23. These side members alternate and the hooks thereof hook respectively over the connecting rings 20 and 21 when assembled for use. Near the unconnected end of the horizontal member the same is chamfered on the edges at 24 and is also chamfered near its junction with the side member at 25 as best shown in Fig. 4. When assembled for use the horizontal members overlap each other so that the chamfered portion of the outer end of one member registers with the chamfered portion of the other member of the adjacent spring near its junction with the side member. On these chamfered portions are secured binding clips $25^a$ which consist of upper and lower members having grooves to fit on the chamfer of the springs. These clip members are united by rivets 26, which hold the clips securely upon the horizontal members. These clips are staggered as best shown in Fig. 2.

Between the outer ends of the inner springs and the hook ends of the rim springs are the binding rings 27 and 28 which are bent transversely as best shown in Fig. 2 to weave in between the said springs to hold them spaced and so they cannot spring off the connecting rings 20 and 21. Upon the outer surfaces of the clips are bearing plates 29 which are preferably of spring steel, wide enough to extend across two clips, and long enough to extend a little beyond the horizontal member of the outer spring, as best shown in Figs. 2 and 3. These bearing plates are secured at two points as shown in Fig. 2 by rivets 26 which are long enough to pass up through the bearing plates and to perform the function of securing the clips and the bearing plates at the same time. These bearing plates have secured upon their outer surfaces a layer or belt of suitable material preferably of heavy leather 30 which is secured thereto by rivets 31 of which there are preferably two in each end of each bearing plate. Additional belts 32 and 33 may be provided to make a heavier wearing tread and when additional belts are provided they are preferably secured to the first belt by rivets 34 of which there are a sufficient number for the purpose. The bearing plates and belts form a tread, but a tread formed in any other way may be used. The connecting rings 20 and 21 are only a little greater in diameter than ring 11 and are smaller in diameter than the outer periphery of central rib 12.

In practice the inner springs are bent and tempered to such shape that when placed on the central rib the outer hook must be sprung downwardly toward the felly to hook over the connecting ring thereby putting the inner springs on a tension. The binding rings 27 and 28 are secured in place by slipping the hooks 23 of the rim springs over the connecting rings and then bringing them up to the position shown in the drawings as best illustrated in Fig. 3, when they are secured in proper position by having the clips passed over the same and the members thereof riveted. The chamfering of the outer springs at 24 and 25 and providing the clip members with recesses or grooves into which the chamfering portions are received hold the rim springs radial when assembled.
The central springs project downwardly on one side of the supporting ribs and then curve upwardly and pass over the central rib and then curve downwardly thereby providing a greater length of spring than would be possible if the curvature were all on one side of the central rib. Such construction avoids sharp turns in the spring material. By having the rim springs in two members the parts can be more readily assembled and in the preparation of the same they are so bent and tempered that when assembled they have the tendency to push the connecting rings outwardly or away from rib 12. This division of the springs into outer and inner spring gives a greater length of spring without sharp turns and permits the use of connecting rings which also act as tension rings and places the connecting point at a point nearer the hub than the supporting point of the springs, thereby allowing lateral and vertical motion. The connecting rings and the binding rings operate to cause a large number of springs to act together to sustain the weight. If too great weight is placed on the vehicle to be sustained by the resiliency of the tire springs they can come together upon the central rib without breaking. Supporting the inner springs upon the central rib and connecting the outer spring thereto on a line of greater diameter permits the bearing surface of the tire to remain flat on the ground when turning corners and therefore there is less liability of the wheels to skid than with the ordinary pneumatic tire. The outer and inner springs are preferably made of steel wire, and each may be formed of a single piece.

Having described my invention what I claim is:—

1. A tire comprising a ring member having an outwardly projecting rib, said rib having lugs on the side thereof and notches in the outer periphery; inner springs having C-shaped bodies and hooks on their ends, the inner hooks being joined to the C-shaped body by a straight member; L-shaped outer springs having hooks on one end thereof; connecting rings over which the outer hooks of the inner springs and the hooks of the outer springs pass; clips connecting the ends of the outer springs from one side of the tire with the ends of the outer springs on the other side of the tire; and a tread secured to said clips.

2. A tire comprising a ring member having an outwardly projecting rib provided with notches in its outer periphery and spacing lugs on the sides thereof; inner springs having C-shaped bodies and hooks at the ends thereof hooked upon said ring member and projecting alternately therefrom at right angles to the plane of said rib; L-shaped outer springs having hooks on one end thereof; connecting means between the outer and inner springs; connecting means between the other ends of the outer springs; and a tread secured to the means connecting the ends of the outer springs.

3. A tire comprising a tread; outer springs composed of sectional L-shaped members secured to said tread; inner springs having C-shaped bodies; means to connect said outer and inner springs; and supporting means for said inner springs, said supporting means being adapted to be secured upon the felly.

4. The combination of a felly with an elastic tire secured thereto, comprising an annular ring having an outwardly projecting central rib; sectional inner springs having C-shaped bodies secured upon the rib of said annular ring and extending over and alternately projecting in opposite directions away from the rib and extending to points closer to the felly than the periphery of the rib; sectional outer springs; connecting means between said outer and inner springs; and a tread secured to said outer springs.

5. An elastic tire comprising a ring having an outwardly projecting rib; sectional inner and outer springs; concentric connecting rings of less diameter than the diameter of the outer periphery of the rib of the ring forming the connecting means between the outer and inner springs and lying on opposite sides of said rib; and a tread secured upon the outer springs.

6. An elastic tire comprising outer and inner springs; supporting means for the inner ends of the inner springs; connecting means between the outer and inner springs at each side of the supporting means, said connecting means being nearer the hub of the wheel than the points of support of the inner springs; and a tread secured upon the outer springs.

7. In a tire of the character described herein the combination of an annular ring having an outwardly projecting rib with sectional inner rings having C-shaped bodies mounted on said ribs; outer sectional rings; connecting means between said outer and inner rings; and a tread connected to said outer springs.

8. In a tire of the character described herein, a combination of an annular ring having an outwardly projecting rib; spring connecting means at each side of said rib lying closer to the hub than the periphery of the rib; sectional inner springs supported by said ribs, said springs engaging said connecting means; outer sectional springs connected at one end to said connecting means and having the other ends overlapping; clips upon the overlapping ends of said outer springs, said clips being staggered; and a tread secured to said clips.

9. The combination, with a wheel rim, of an inner ring carried thereby, an outer ring spaced around said inner ring, a tread secured to said outer ring, inner springs secured to said inner ring and having crossed arms, outer springs secured to said outer ring and having separated arms, and means independent of said rings for connecting said arms of said inner and said outer springs.

In witness that I claim the foregoing I have hereunto subscribed my name this 27th day of June, 1908.

JOSEPH P. MAGNEY.

Witnesses:
G. E. HARPHAM,
S. B. AUSTIN.